UNITED STATES PATENT OFFICE.

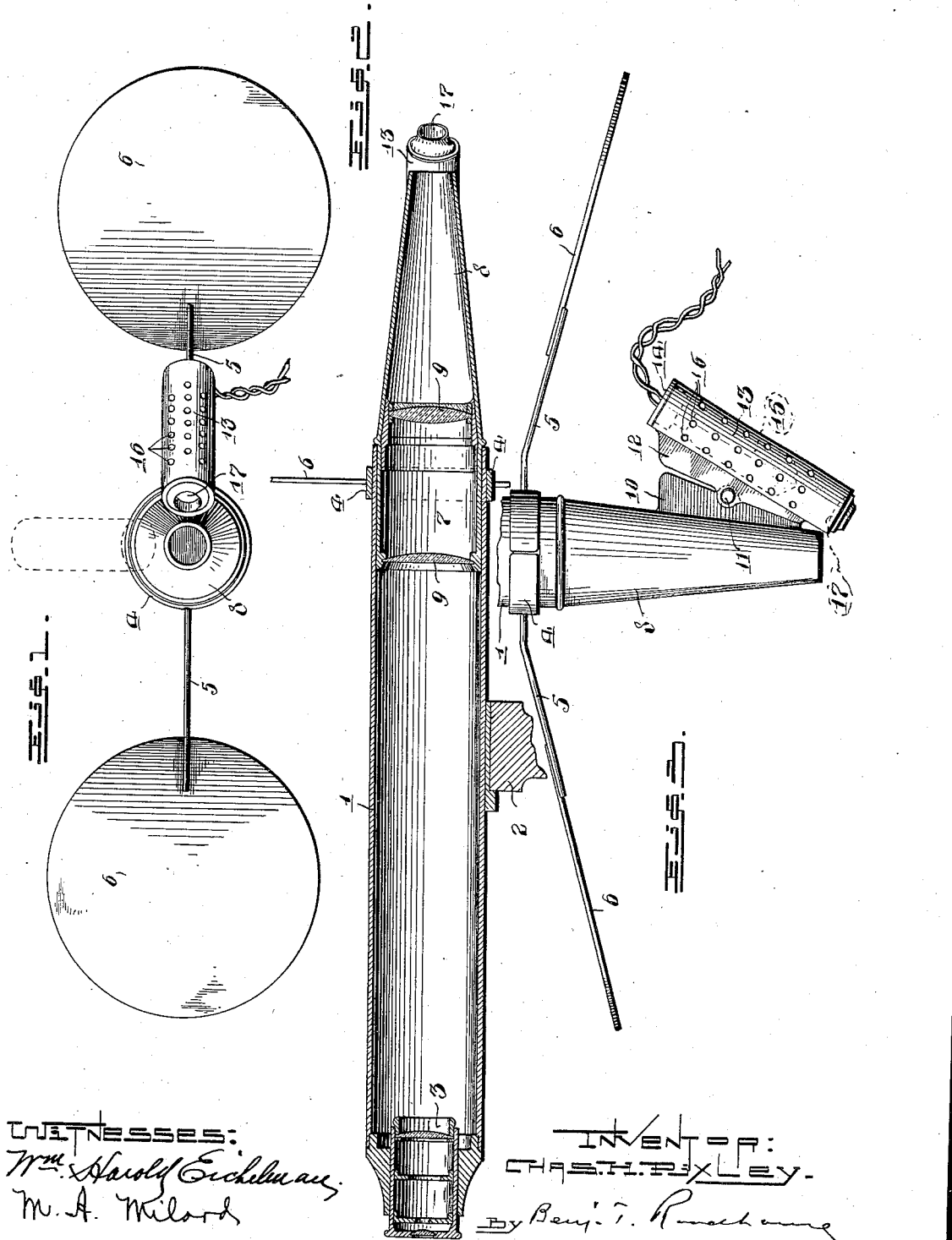

CHARLES HENRY PIXLEY, OF CHICAGO, ILLINOIS, ASSIGNOR TO F. A. HARDY & COMPANY, A CORPORATION OF ILLINOIS.

CORNEAL MICROSCOPE.

1,073,436.   Specification of Letters Patent.   Patented Sept. 16, 1913.

Application filed August 19, 1912. Serial No. 715,708.

*To all whom it may concern:*

Be it known that I, CHARLES HENRY PIXLEY, a citizen of the United States, and a resident of Chicago, in the county of Cook and State of Illinois, have invented certain new and useful Improvements in Corneal Microscopes, of which the following is a specification.

My invention relates more particularly to the provision, in combination with suitable arrangements for magnification of a microscope proper, of means for securing the desired illumination of the portion of the cornea under observation. The angle and direction of illumination of an object under examination is of the utmost importance, and the spherical form of the cornea imposes special conditions which have to be taken into account in properly illuminating it for microscopical examination.

There are at present upon the market and in general use optical instruments, such as the ophthalmometer illustrated and described in United States Letters Patent No. 631,307, which employ one of the usual forms of eye pieces suitable for a microscope. The structure hereinafter described may be used as attachments for such instruments, thereby making it possible for the owner of one of these expensive instruments of special and very limited use to transform it into a corneal microscope by the addition of a few simple attachments.

I secure the objects of providing the necessary attachments for transforming an instrument already having an eye piece into a corneal microscope, and of providing facilities for illuminating the cornea in the desired manner by means of the structure illustrated in the accompanying drawing, in which—

Figure 1 is a front elevation (looking into the nose piece or objective) of the eye-shield, nose piece and illuminator in the relative positions they will occupy when in position for use, the illuminator being further shown in dotted lines rotated to a position upon a different meridian of the eye; Fig. 2 is a vertical longitudinal central section through a microscope tube with my nose piece or objective in position, the forward end of the illuminator being shown in elevation; and Fig. 3 is a plan of the forward portion of the structure shown in Fig. 2, showing the eye-shield, nose-piece or objective and illuminator.

Similar reference characters refer to similar parts throughout the several views.

The reference character 1 designates a microscope tube conveniently disposed horizontally upon a slidable stand, 2, and having mounted in one end thereof an eye piece or ocular lens system, 3. These elements, of course, may be found so disposed in instruments at present in use. I provide a collar or band, 4, which will slip over and frictionally engage the tube, 1. Extending from opposite points upon the collar or band, 4, are arms, 5, which carry shields, 6. The arms, 5, and shields, 6, are so proportioned that when a patient's eye is in position for observation one of the shields will be in front of the other eye.

I provide for slipping into the end of the tube, 1, opposite the eye piece, 3, an objective which comprises a cylindrical portion, 7, to fit into said tube and a converged or tapered forward portion, 8, of a length sufficiently long, according to the power of the lenses used, to extend nearly to the cornea so as to substantially exclude all light except that which proceeds from the cornea. It will be seen that the cylindrical portion, 7, which fits into the tube, 1, will permit the objective to be rotated upon its longitudinal axis. Any desired lens or lens system, 9, may be mounted in the objective.

Extending laterally from the forward tapered portion, 8, of the objective is a projection or bracket, 10, to which is pivotally secured by a bolt, 11, a similar projection or bracket, 12, extending laterally from a tube, 13. In the rear end of the tube, 13, is removably mounted an electric light socket, 14, for carrying an electric lighting bulb, 15, within said tube. The tube, 13, is provided with ventilating apertures, 16, so that it will not become too hot, and in its forward end is mounted a condensing lens, 17, so that the light may be condensed upon the cornea without focalizing thereon or reflectng therefrom an image of lamp.

It will now be seen that by swinging the tube, 13, upon its pivotal connection with the objective, light may be directed at a great many angles upon a cornea disposed in front of the objective, and that by rotating the objective upon its axis the light will be directed upon the eye from any desired meridian. It will be further seen that my improvements may be embodied in a few simple attachments easily assembled with a number of optical instruments at present in use.

Having thus described my invention, what I claim as new and desire to secure by Letters Patent, is:—

1. A corneal microscope comprising a tube, an eye piece set in one end thereof, a separate objective casing rotatably mounted with relation to said tube, a projection extending laterally from said objective casing, a lamp casing carried by said projection and a condensing lens mounted in the forward end of said lamp casing.

2. A corneal microscope comprising a tube, an eye piece set in one end thereof, a separate objective casing rotatably mounted with relation to said tube, a projection extending laterally from said objective casing, a lamp casing pivotally carried by said projection and a condensing lens mounted in the forward end of said lamp casing.

3. A microscope attachment comprising a separate objective casing having a cylindrical portion adapted to be rotatably mounted in a microscope tube, a projection extending laterally from said objective casing, a lamp casing carried by said projection and a condensing lens mounted in the forward end of said lamp casing.

4. A microscope attachment comprising a separate objective casing having a cylindrical portion adapted to be rotatably mounted in a microscope tube, a projection extending laterally from said objective casing, a lamp casing pivotally carried by said projection and a condensing lens mounted in the forward end of said lamp casing.

In testimony whereof I affix my signature in the presence of two witnesses.

CHARLES HENRY PIXLEY.

Witnesses:
 E. O. TROEGER,
 JOHN H. HORDIN.

Copies of this patent may be obtained for five cents each, by addressing the "Commissioner of Patents, Washington, D. C."